(12) United States Patent
Klowden et al.

(10) Patent No.: US 7,656,983 B2
(45) Date of Patent: Feb. 2, 2010

(54) DUAL CLOCK DOMAIN DESKEW CIRCUIT

(75) Inventors: Daniel S. Klowden, Denver, CO (US); S. Reji Kumar, University Place, WA (US); Adarsh Panikkar, Tacoma, WA (US); Kersi H. Vakil, Olympia, WA (US); Abhimanyu Kolla, Tacoma, WA (US)

(73) Assignee: Intel Corporation, Santa Clara, CA (US)

( * ) Notice: Subject to any disclaimer, the term of this patent is extended or adjusted under 35 U.S.C. 154(b) by 574 days.

(21) Appl. No.: 11/541,427

(22) Filed: Sep. 29, 2006

(65) Prior Publication Data

US 2008/0080654 A1    Apr. 3, 2008

(51) Int. Cl.
*H04L 7/00*      (2006.01)
*H04L 25/00*     (2006.01)
*H04L 25/40*     (2006.01)

(52) U.S. Cl. .................... 375/371; 327/153; 327/158; 327/161

(58) Field of Classification Search ......... 375/371–376; 327/147–163
See application file for complete search history.

(56) References Cited

U.S. PATENT DOCUMENTS

2006/0188050 A1*  8/2006  Jenkins et al. .............. 375/371
2006/0261869 A1* 11/2006  Gomm et al. ............... 327/158

* cited by examiner

*Primary Examiner*—Curtis B Odom
(74) *Attorney, Agent, or Firm*—Ryder, Lu, Mazzeo and Konieczny, LLC; Douglas J. Ryder

(57) ABSTRACT

In general, in one aspect, the disclosure describes an apparatus including a first deskew unit and a second deskew unit. The first deskew unit operates at a first clock domain and provides fine timing adjustment to a signal. The second deskew unit operates at a second clock domain that is slower than the first clock domain and provide coarse timing adjustment to the signal.

14 Claims, 6 Drawing Sheets

DUAL CLOCK DOMAIN DESKEW CIRCUIT

BACKGROUND

In communication systems data is transferred between transmitters and receivers. The data may be transmitted from one system to another, from one processor to another or from one functional unit to another. Data may be transmitted over multiple channels (lanes) between the transmitter and receiver. Signals being transmitted between transmitter and receiver over multiple channels may lose time reference with respect to each other (become skewed). The skew is likely introduced because of mismatches in the channels (e.g., length, impedance). For example, the physical interconnects forming multiple channels between transmitter and receiver on boards or integrated circuits (ICs) may follow different paths and/or have different lengths.

FIG. 1 illustrates an example multi-lane (three) connection 100 between a transmitter 110 and a receiver 120. The three lanes (channels) 100 travel different paths and accordingly have different lengths. As might be expected the timing associated with data (e.g., I/O signals) transmitted over the lanes 100 would vary and the signals would be skewed. As computing (e.g., I/O) speeds continue to increase, the trace mismatches between various lanes 100 result in an increasing number of bit cells worth of skew and misalignment.

One way to correct the skew would be with trace-matching of the interconnects. However, trace matching for multiple lanes is tedious, and at times unfeasible, given routing congestions and obstructions that may be present with board and/or chip design.

Deskewing is an operation performed at the receiver 120 for negating/canceling out skew between the communications lanes. Deskewing enables data streams to regain time/phase relationships with respect to each other. Communication systems employing multiple channels carrying data with forwarded/embedded clock information must have some means of deskewing the received information before further data processing can be done. As the transmission frequency increases and/or lane mismatches increase, the total amount of skew increases.

BRIEF DESCRIPTION OF THE DRAWINGS

The features and advantages of the various embodiments will become apparent from the following detailed description in which.

DETAILED DESCRIPTION

Determining the amount of skew in parallel data transfers (e.g., signals transferred over a plurality of channels) may be implemented in numerous ways. The various skew determination methods will not be described herein. However, all of the various methods are within the current scope of the various embodiments described herein.

Once the skew is determined, deskewing can be accomplished to remove/negate the skew (time difference) between the signals. According to one embodiment, deskewing is accomplished by delaying earlier received signals to be in alignment with later received signals. The delay in the earlier received signals may be accomplished by running the data through a series of flip-flops (pipeline stages) operating at a certain frequency. The more flip-flops that are activated the longer the delay. Each flip flop may delay the signal by one clock cycle. The clock cycle, and hence delay, is. inversely proportional to the speed that the flip-flop is operating at.

Figure 1:
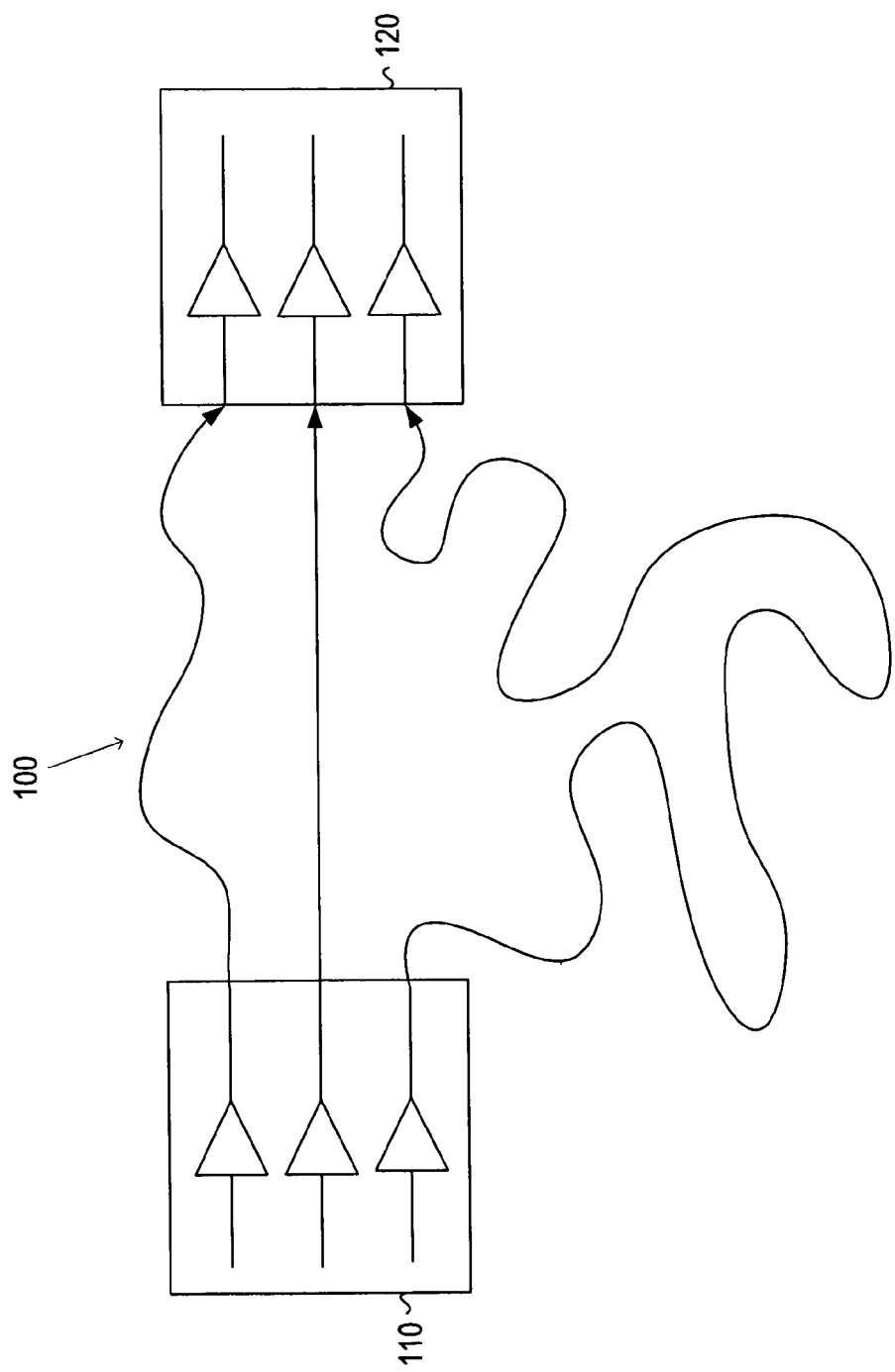
FIG. 1 illustrates an example multilane connection between a transmitter and a receiver, according to one embodiment.
Figure 2:
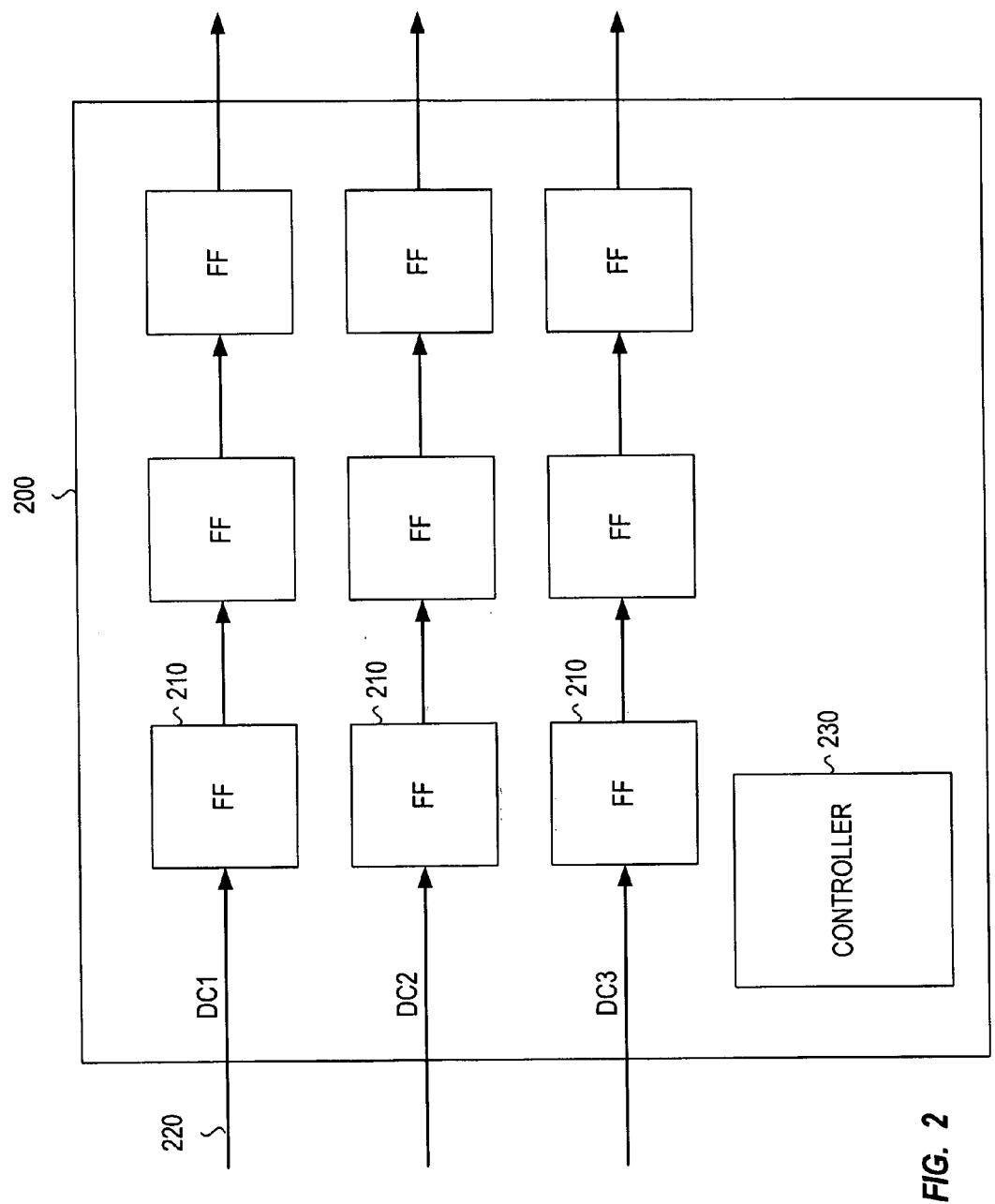
FIG. 2 illustrates a simplified diagram of an example deskewing logic, according to one embodiment.

FIG. 2 illustrates a simplified diagram of an example deskewing logic 200. The deskewing logic 200 may include a series of flip-flops 210 for each data channel 220 and a deskew controller 230. While not included in FIG. 2 for ease of illustration a clock signal is provided to each flip-flop 210 and the deskew controller 230 may be connected to each flip-flop 210. The deskew controller 230 may be used to activate an appropriate number of flip-flops 210 for each data channel 220 to align the plurality of signals received over the data channels 220. For example, assume that dath channel 1 (DC1) is the slowest path, that DC2 is 1 cycle faster, and that DC3 is 3 cycles faster. The deskew controller 230 may activate 1 flip-flop 210 on DC2 to slow the data down 1 cycle and may activate 3 flip-flops 210 on DC3 to slow the data down 3 cycles.

As computing frequencies increase, the granularity of deskewing increases and thereby the amount of flip-flops required to delay a signal a certain amount increases. By was of example, if the operating speed of the deskewing logic was 1.0 GHz, each clock cycle would delay the signal 1 ns, and it would take 1 clock cycle to implement a 1 ns delay. If the speed was increased to 4.0 GHz, each clock cycle would delay the signal 250 ps, and it would take 4 clock cycles to implement the same 1 ns delay. Requiring additional clock cycles to delay a signal would entail additional pipeline stages (flip-flops) being added to the system. The increase in pipeline stages would increase the die area consumed by the deskewing logic and the power required.

For systems that allow buffering or retiming of the data through a channel the possible amount of skew between various lanes increases and accordingly the amount of skew that needs to be absorbed is increased. For example, a system implementing a fully buffered DIMM (FBD) protocol requires that up to 9.5 ns worth of skew between lanes needs to be absorbed. Accordingly, a deskewing logic would need to be designed to absorb 9.5 ns of skew (the maximum skew). If the bit-rate was 4.8 Gbps and the operating clock frequency was 2.4 GHz, each clock cycle would delay a signal 417 ps (deskew resolution of 417 ps, or two symbol periods) and 23 clock cycles would be required to delay a signal the maximum skew of 9.5 ns. That is, the deskewing logic would require a maximum of 23 cycles to realign all of the data. Each such cycle would require a pipeline stage (flip-flop) functioning at the high-speed clock frequency. In this example, the deskewing logic would require 23 pipeline stages, two flip-flops wide per channel and consume a tremendous amount of area and power.

Moving the deskewing operation to a slower clock domain would reduce the number of skew stages needed and thus the power and area. However, it would also reduce the deskew resolution an there would be less granularity in the deskew. For example, if the deskewing was shifted from the 2.4 GHz clock domain to a 600 MHz clock domain, the deskew resolution would be increased to 1.67 ns. Accordingly, if the amount of deskew required was 2.5 ns, the deskew circuitry could either provide 1.67 ns of delay in one clock cycle or 3.33 ns of delay in two clock cycles so that in either event the signals will still be skewed by 833 ps (either delayed by 833 ps too little or delayed by 833 ps too much).

Figure 3A:
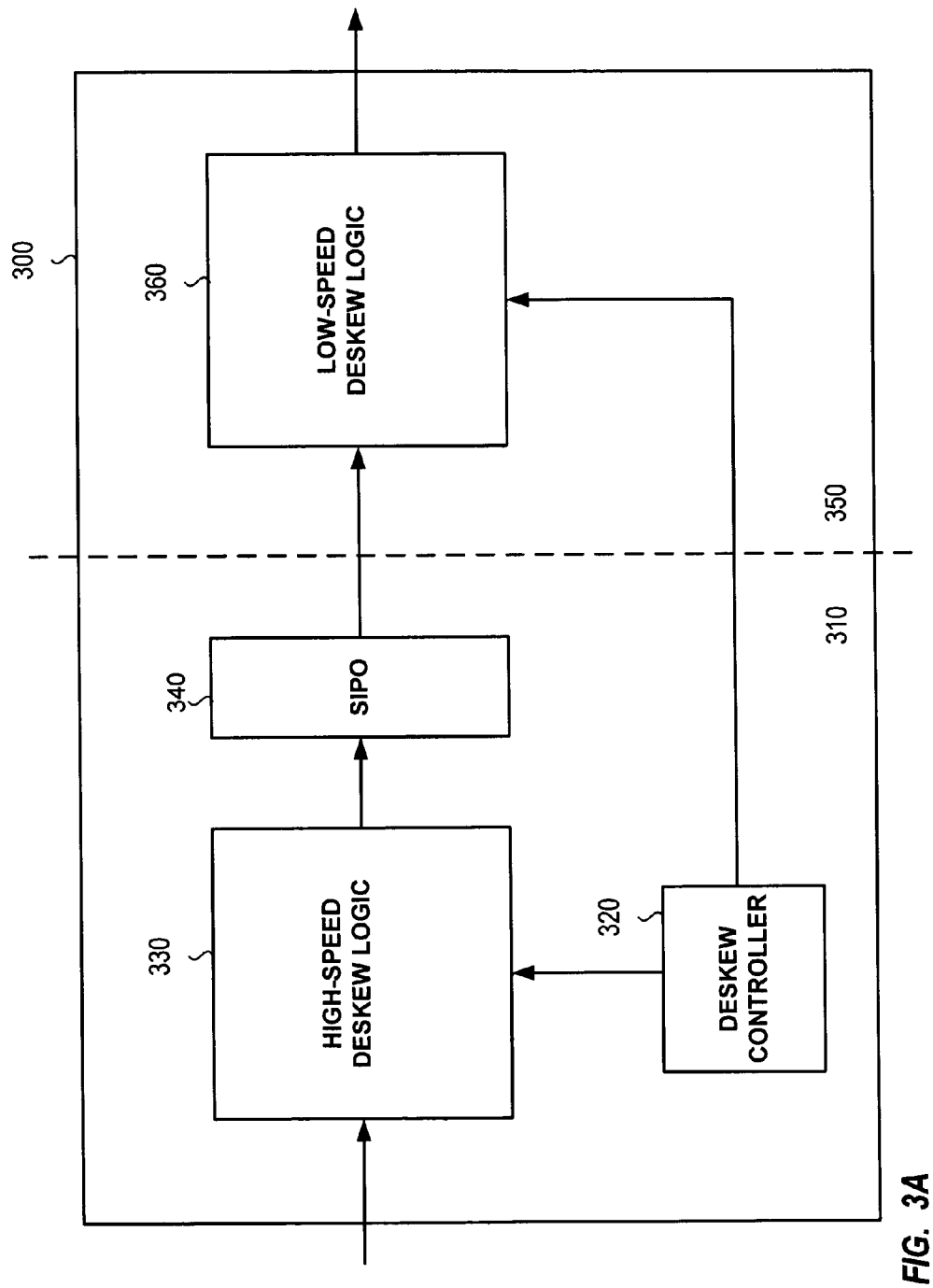
FIGS. 3A-B illustrate an example dual clock domain deskew circuit, according to one embodiment.

FIG. 3A illustrates an example dual clock domain deskew circuit 300. The deskew circuit 300 includes a high-speed domain 310 and a low-speed domain 350. The high-speed domain 310 may be used for fine deskew resolution, while the low-speed domain 350 may be used to handle coarser deskew steps with lower active power. The high-speed domain 310 includes a deskew controller 320 and high-speed deskew logic 330. The high-speed domain 310 may also include a serial-in-parallel out (SIPO) 340. The low-speed domain 350 includes low-speed deskew logic 360.

The high-speed domain 310 operates at a frequency of X and the low-speed domain 350 operates at a frequency of X/N. The SIPO 340 therefore takes N cycles of serial data from the high-speed deskewing logic 330 and places them in N parallel channels for processing by the low-speed deskewing logic 360. That is, as the high-speed deskewing logic 330 is N times faster that the low-speed deskewing logic 360, N cycles of data will be available from the high-speed deskew logic 330 each cycle of the low-speed deskew logic 360. Accordingly, the low-speed deskewing logic 360 will include logic for deskewing N parallel paths of data during each clock cycle.

The number of high-speed deskew logic stages (H) may be equal to N−1, where a high-speed stage may be a single flip-flop. The number of low-speed deskew logic stages (L) may be equal to the quotient of $T_{max}/N$, where $T_{max}$ is the maximum lane skew converted to high-speed stages. A low-speed stage may be N parallel paths containing a single flip-flop.

By way of example, assume the high-speed domain is 4 GHz, the low-speed domain is 1 GHz (so that N=4) and the maximum skew is 4.5 ns. Each high-speed clock cycle would provide a deskew resolution of 250 ps and it would take a maximum of 18 clock cycles to provide the maximum skew of 4.5 ns. There would be a total of 3 (N−1) stages in the high-speed deskew logic 330 and a total of total of 4 stages (quotient of 18/4) in the low-speed deskew logic 360. Each high-speed stage would provide 250 ps of deskew and each low-speed stage would provide 1 ns of deskew.

Figure 3B:
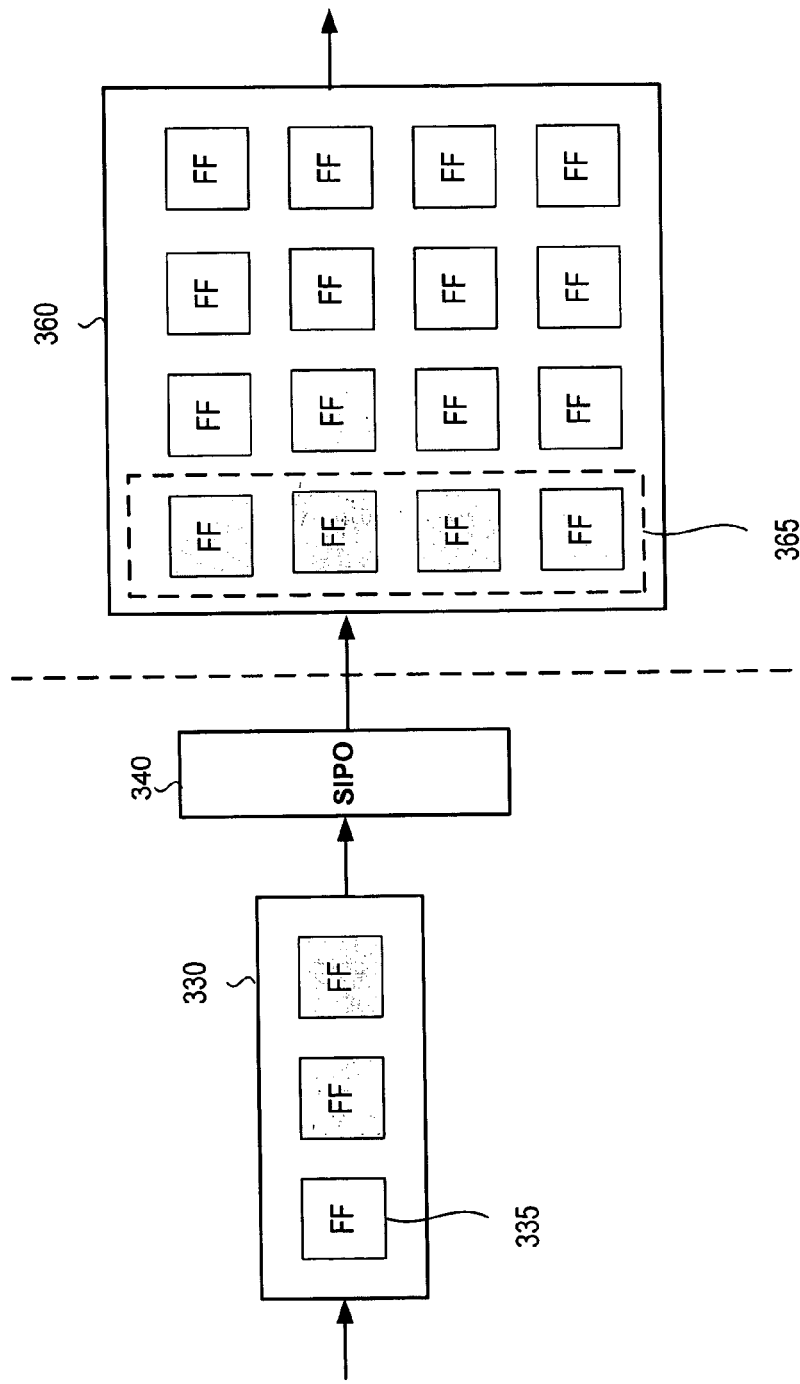

FIG. 3B illustrates stages within the dual clock domain deskew circuit 300 of FIG. 3A for the example described above. The high-speed deskew logic 330 includes 3 stages (each stage being a flip-flop) 335 and the low-speed deskew logic 360 includes 4 stages (each stage being 4 parallel flip-flops) 365.

In operation the deskew controller 320 controls how much deskew should be provided to a datapath in each domain (high-speed 310 and low-speed 350). That is, the deskew controller 320 determines how many stages in the high-speed deskew logic 330 and how many stages in the low-speed deskew logic 360 need to be activated. The amount of deskew needed for a data path is converted to high-speed cycles ($T_{need}$). The amount of low-speed stages to be activated (and thus the amount of low-speed cycles required) is $L_{need}$, where $L_{need}$ equals the quotient of $T_{need}/N$. The amount of high-speed stages to be activated (and thus the amount of high-speed cycles required) is $H_{need}$, where $H_{need}$ equal to the remainder of $T_{need}/N$.

By way of example, assume that a certain signal requires 2.75 ns of deskew (equivalent of 11 high-speed cycles, $T_{need}=11$). The number of low-speed stages activated ($L_{need}$) would be 2 (quotient of 11/4) and the number of high-speed stages activated ($H_{need}$) would be 3 (remainder of 11/4). The signal is received over the data path by the high-speed deskew logic 330. The high-speed deskew logic 330 delays the signal 750 ps during three high-speed clock phases. After the signal is passed through the SIPO 340, it is passed to the low-speed deskew logic 360 where it is delayed 2 ns during two low-speed clock signals. FIG. 3B illustrates the stages that would be activated in this example as shaded.

The dual clock domain deskew circuit 300 maintains deskew resolution and consumes lower power as it requires less high-speed clock cycles as it moves deskew stages to the slower clock domains. The flip-flops used on the datapath will be operated at lower frequency so there will be an active power savings. Furthermore, due to the lower performance requirement of the low-speed domain's flip-flops, a majority of the pipeline stages may also be tuned to reduce leakage current. Moreover, moving datapath elements from a high-speed custom domain to a low-speed synthesized domain may save development time by automating part of the design logic, allow for reuse of some of the design logic, and may allow for easy interface connectivity for testing.

The high-speed and low-speed clock domains discussed with respect to FIG. 3A-B can be any high-speed and low-speed clock domains utilized in a system. For example, the high-speed clock domain may be an I/O clock domain and the low-speed clock domain may be the core clock domain. Accordingly, the high-speed deskewing may be performed in the I/O and the low-speed deskewing may be performed within the core. However, one or more of the clock domains may be derived. Moreover, the terms high-speed and low-speed do not specify any range of frequencies but rather are meant to indicate the relative speed with respect to each other (e.g., one is faster than the other).

The dual clock domain deskew circuit 300 could be implemented in any device receiving signals over multiple channels regardless of the function being performed by the device. The device could be receiving the data over multiple physical interconnects (e.g., copper, fiber) or via wireless channels. The circuit 300 could be implemented at the system, board, or integrated circuit level. The circuit 300 could be implemented in memory receiving data over multiple channels.

Figure 4:
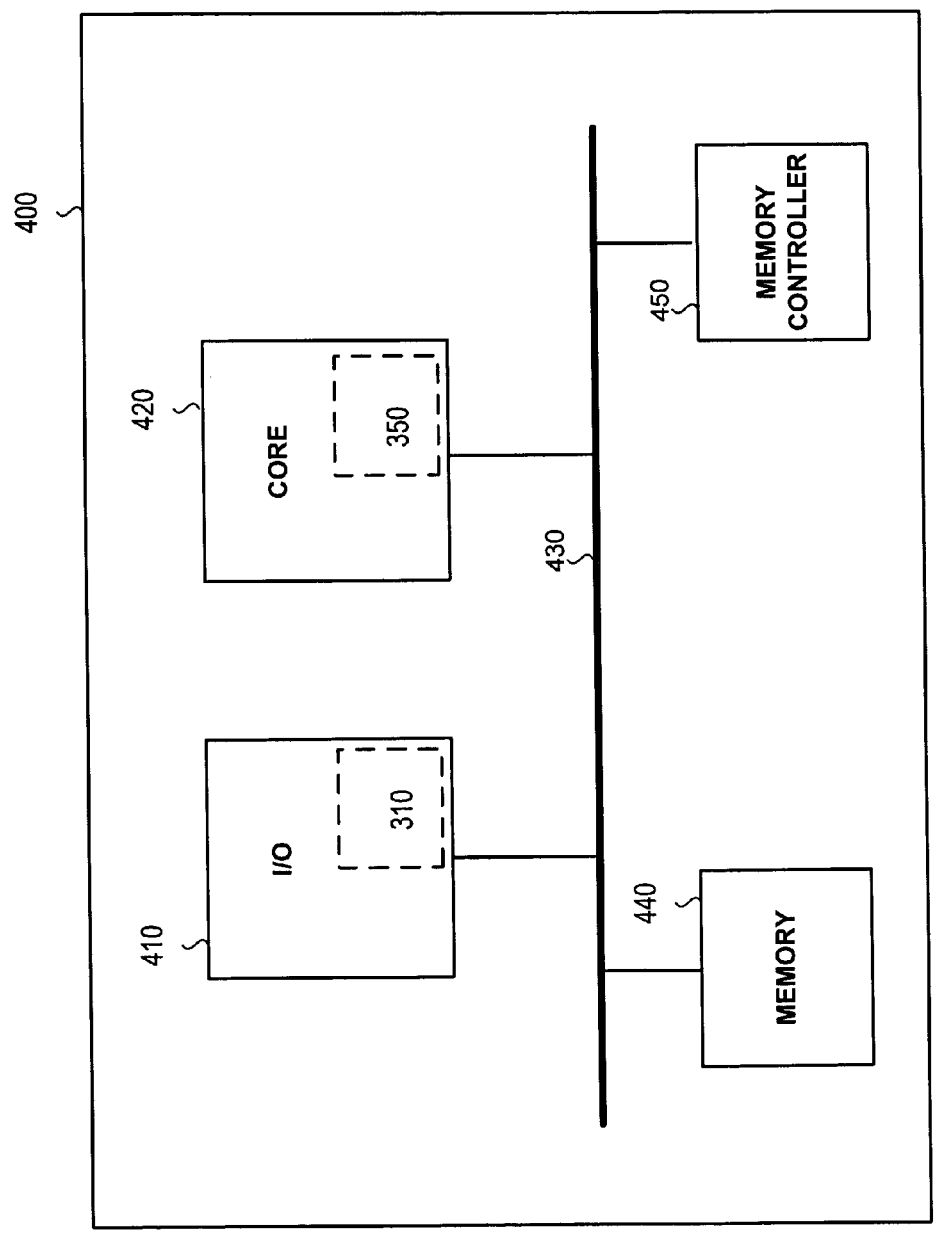
FIG. 4 illustrates a simplified block diagram of an example IC that may implement the dual clock domain deskew circuit, according to one embodiment.

FIG. 4 illustrates a simplified block diagram of an integrated circuit (IC) 400 that may implement the dual clock domain deskew circuit (e.g., 300). The IC 400 includes an input/output (I/O) 410 and a core (processing unit) 420 connected via a shared bus 430. The IC 400 may include on-die memory 440 and/or a memory controller 450 for interfacing with off-die memory. The memory controller 450 may be integrated with the core 420. The IC 400 may perform simple or complex functions. The IC 400 may a processor (e.g., I/O processor, network processor). The I/O 410 may receive signals via physical links such as board interconnects or may receive the signals via a wireless connection.

The dual clock domain deskew circuit (e.g., 300) may be implemented with the I/O 410 and the core 420. That is the high-speed and high resolution deskewing may be performed within the I/O 410 at the I/O clock domain while the low-speed low power deskewing may be performed within the core 420 at the core clock domain.

The dual clock domain deskew circuitry (e.g., 300) may be utilized in any number of communication systems. For example, the dual clock domain deskew circuitry could be utilized in wireless devices (e.g., cell phones, PDAs), network devices (e.g., switches, routers), or computer systems (e.g., servers, PCs).

Figure 5:
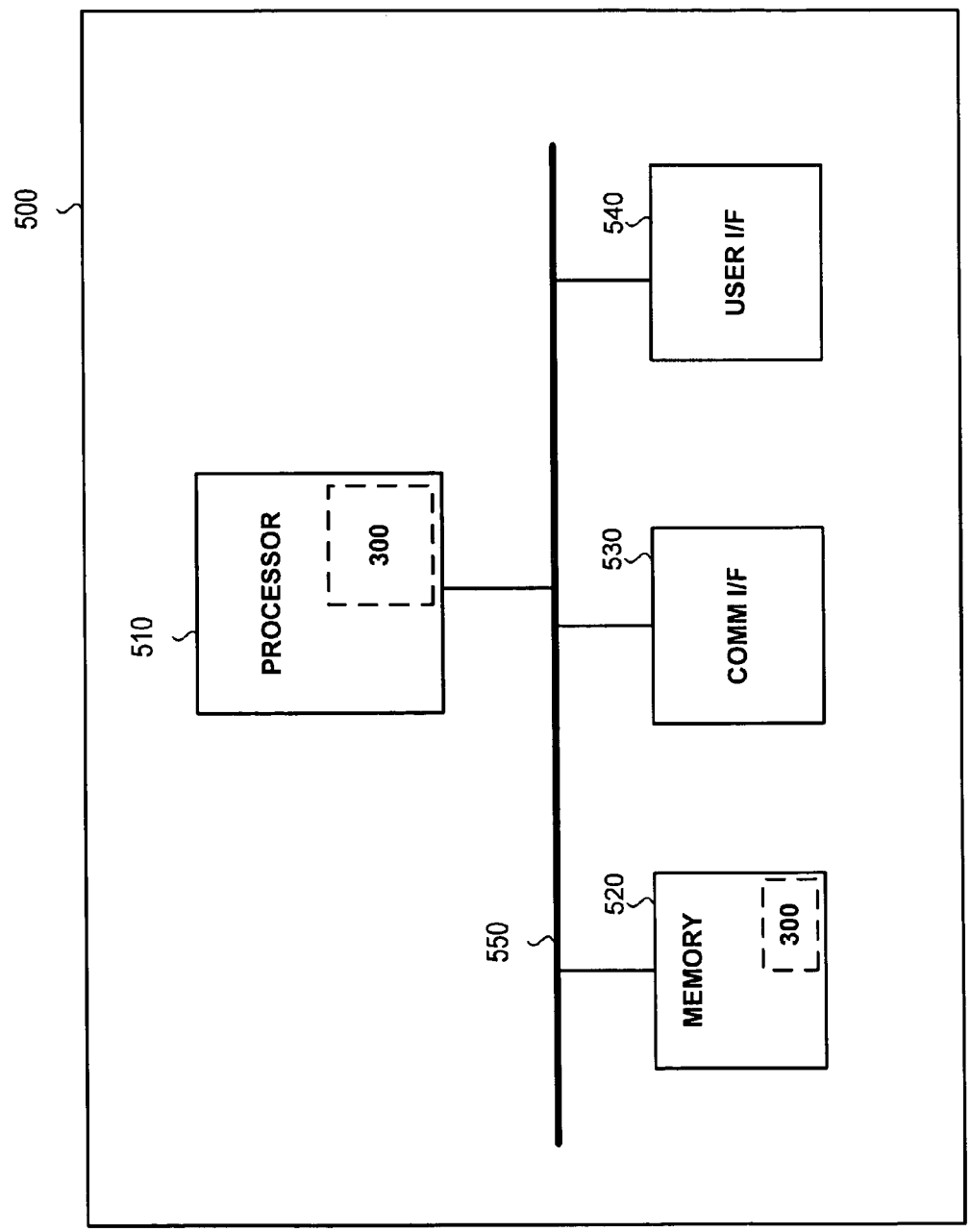
FIG. 5 illustrates a simplified block diagram of an example system that may implement dual clock domain deskewing, according to one embodiment.

FIG. 5 illustrates an example system 500 that could implement dual clock domain deskew circuitry. The system 500 includes a processor 510 (e.g., I/O processor, network processor), off-die memory 520 (e.g., DDR, QDR), a communication interface 530 (e.g., physical link, wireless), and a user interface 540, connected via a shared bus 550. The dual clock domain deskew circuitry (e.g., 300) could be implemented within the processor 510 and/or within the memory 520.

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

What is claimed:

1. An apparatus comprising
   a first deskew unit, operating at a first clock domain, to provide fine timing adjustment to a signal; and
   a second deskew unit, operating at a second clock domain, to provide coarse timing adjustment to the signal, wherein the second clock domain is a factor of N times slower than the first clock domain, wherein number of stages in said second deskew unit is equal to number of first clock domain cycles it would take to obtain maximum deskew absorption divided by N.

2. The apparatus of claim 1, wherein said first deskew unit includes a number of stages equal to N−1.

3. The apparatus of claim 1, further comprising a deskew controller to determine amount of timing adjustment to be provided by said fist deskew unit and said second deskew unit.

4. The apparatus of claim 3, wherein amount of timing adjustment provided by said first deskew unit and said second deskew unit is based on amount of skew desired and N.

5. The An apparatus comprising
   a first deskew unit, operating at a first clock domain, to provide fine timing adjustment to a signal;
   a second deskew unit, operating at a second clock domain, to provide coarse timing adjustment to the signal, wherein the second clock domain is a factor of N times slower than the first clock domain; and
   a deskew controller to determine amount of timing adjustment to be provided by said fist deskew unit and said second deskew unit, wherein amount of timing adjustment provided by said first deskew unit is equal to remainder of N divided into number of first clock domain cycles it would take to obtain desired deskew.

6. The apparatus of claim 5, wherein amount of timing adjustment provided by said second deskew unit is equal to quotient of N divided into the number of first clock domain cycles it would take to obtain the desired deskew.

7. The apparatus of claim 1, further comprising a serial in parallel unit to convert N serial signals processed by said first deskew unit to an N-channel parallel signal.

8. An integrated circuit comprising
   an input/output unit, operating at a first clock domain, to communicate with external devices over a series of channels, wherein said input/output unit includes a first deskew unit to provide fine deskew adjustments to skewed data; and
   a core logic unit, operating at a second clock domain that is a factor of N times slower than the first clock domain, to process the data, wherein said core logic unit includes a second deskew unit to provide coarse deskew adjustments to the skewed data, wherein the first deskew unit includes a number of stages equal to N−1 and the second deskew unit includes a number of stages equal to number of first clock domain cycles it would take to obtain maximum deskew absorption divided by N.

9. The circuit of claim 8, wherein said input/output unit further includes a deskew controller to determine amount of deskew adjustment to be provided by the first deskew unit and the second deskew unit based on desired amount of deskew for a signal.

10. The circuit of claim 9, wherein amount of deskew adjustment provided by the first deskew unit and the second deskew unit is based on N divided into number of first clock domain cycles it would take to obtain the desired deskew, wherein the first deskew unit provides a number of cycles of delay equal to remainder and the second deskew unit provides a number of cycles of delay equal to quotient.

11. The circuit of claim 8, wherein said input/output unit further includes a serial in parallel out unit to convert N serial signals to an N-channel parallel signal.

12. A system comprising
    a processor receiving signals over multiple channels, wherein the processor includes a dual clock domain deskew circuit having
       a first deskew unit, operating at a first clock domain, to provide fine deskew adjustment to skewed signals; and
       a second deskew unit, operating at a clock domain, to provide coarse deskew adjustment to the skewed signal, wherein the second clock domain is a factor of N times slower than the first clock domain, wherein the first deskew unit includes a number of stages equal to N−1 and the second deskew unit includes a number of stages equal to number of first clock domain cycles it would take to obtain maximum deskew absorption divided by N; and
    off die memory.

13. The processor of claim 12, wherein amount of deskew adjustment provided by the first deskew unit and the second deskew unit is based on N divided into number of first clock domain cycles it would take to obtain desired deskew, wherein the first deskew unit provides a number of cycles of delay equal to remainder and the second deskew unit provides a number of cycles of delay equal to quotient.

14. The system of claim 12, wherein said off-die memory includes a dual clock domain deskew circuit.

* * * * *